Dec. 22, 1925.   1,566,923
G. W. ROBERTS
BEARING
Filed May 22, 1925
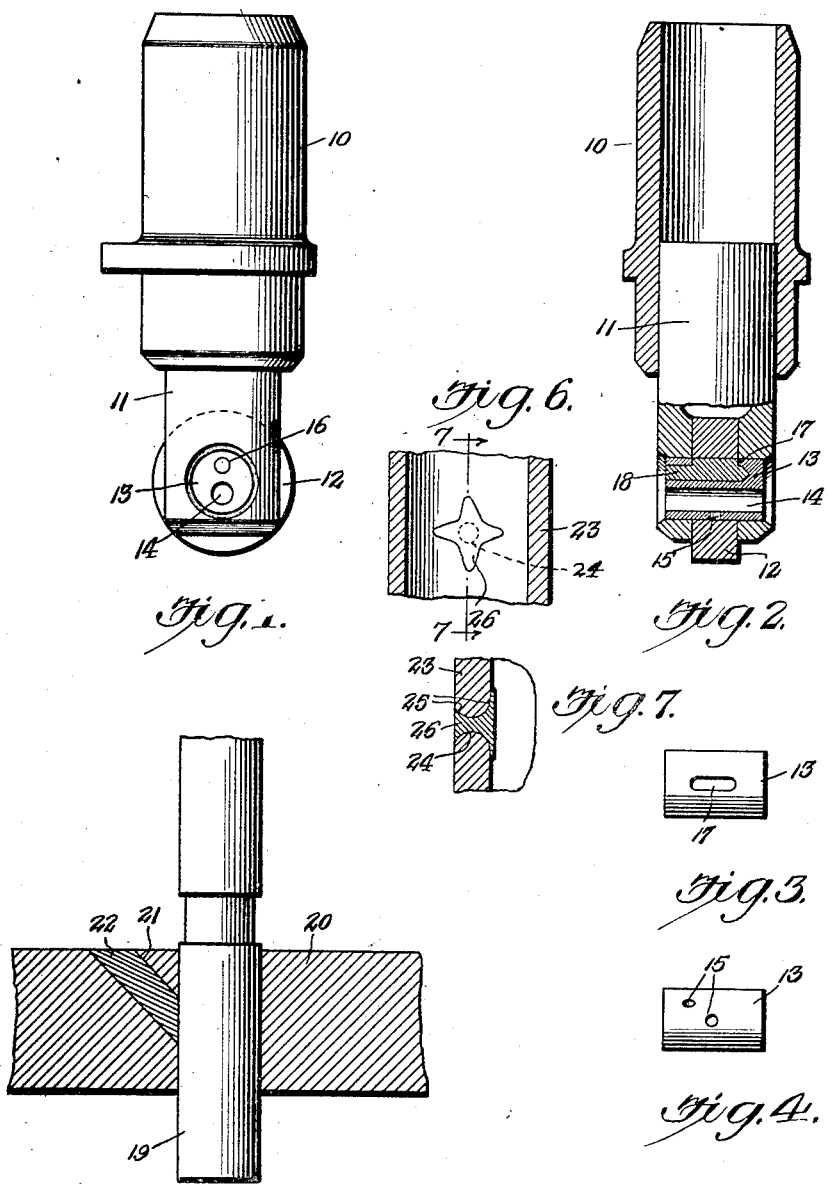

Patented Dec. 22, 1925.

1,566,923

UNITED STATES PATENT OFFICE.

GEORGE W. ROBERTS, OF VICKSBURG, MISSISSIPPI.

BEARING.

Application filed May 22, 1925. Serial No. 32,100.

*To all whom it may concern:*

Be it known that I, GEORGE W. ROBERTS, a citizen of the United States, residing at Vicksburg, in the county of Warren and State of Mississippi, have invented certain new and useful Improvements in Bearings; and I do hereby declare the following to be a full, clear, and exact description of the invention, such as will enable others skilled in the art to which it appertains to make and use the same.

The present invention relates to bearings, and has for an object to provide an improved structure of bearing for taking up lost motion from time to time incident to the wear of the bearing, and without separating or removing the parts thereof.

Another object of the invention is to provide a bearing particularly of the type which wears at one or more definite points, and which is provided with a relatively soft bearing metal so positioned in the bearing that the same may be compressed from time to time and forced into the space or spaces formed incident to wear so as to take up such wear and maintain the bearing tight at all times.

Another object of the invention is to so construct a bearing as to support a body of soft metal in position for easy access of a punch or other instrument for compressing the soft metal in the space formed by wear in the bearing parts and which is so constructed that additional metal may be added from time to time without disturbing the relation of the parts or disassembling the bearing.

Another object of the invention is to provide a bearing which may be readily applied to rocker arms, valve lifters, valve guides, wrist pins particularly in pistons, and may be generally applied to all types of bearings, particularly those receiving wear or thrust at one or more points which are known, so as to fill any spaces formed by wear and to maintain the bearings tight at all times to prevent play or lost motion in the same.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side elevation of a valve lifter and its sleeve, such as used in internal combustion engines.

Figure 2 is a vertical section taken through the same at right angles axially to the showing in Figure 1.

Figure 3 is a detail top plan view of the bearing pin for the roller in the valve lifter.

Figure 4 is a bottom plan view of the same.

Figure 5 is a fragmentary sectional view through a portion of a crank case of an internal combustion engine, showing a valve lifter, and illustrating a slightly modified form of the bearing.

Figure 6 is a sectional view through another modified form of bearing showing the inner side thereof where the soft metal has been spread over the surface to take up wear, and Figure 7 is a fragmentary sectional view taken on the line 7—7 of Figure 6 and showing the construction of the bearing for anchoring the bearing metal therein.

Referring to the drawing, 10 designates a sleeve in which is fitted a reciprocating valve lifter 11 forked at its lower end and provided with an antifriction roller 12 adapted to engage the cams of a cam shaft of an internal combustion engine for raising the lifter 11. The roller 12 is mounted on the bearing pin 13 provided at its lower part with a through opening 14 which opens through the opposite ends of the pin for receiving oil, and as shown in Figure 4, the pin 13 is provided at its lower side with one or more apertures 15 leading from the oil opening 14 to the exterior lower side of the bearing pin. Oil is thus conducted to the interior of the roller 12 and the exterior surface of the pin 13 for lubricating the same.

In order to take up the wear between the pin and the roller, incident to the impact upon the roller 12 in raising and lowering the lifter 11, the pin 13 is provided in one end with a longitudinal opening 16 which extends partly through the pin but which is closed at its inner end, and which is located in the top side of the pin as shown. The top or upper side of the pin 13 is provided with an elongated slot or opening 17 which corresponds substantially to the width of the bearing surface of the roller 12, and which communicates with the upper opening 16. A body of soft bearing metal 18, such as Babbitt metal, is packed in the opening 16 and slot 17 and is adapted to form a continuation of the outer bearing surface of the pin 13. The bearing metal 18 is carried to the outer end of the pin 13 and the metal may be compressed or forced inwardly through the opening 16 and slot 17 by a punch or other suitable implement for the purpose of forcing and spreading the metal 18 into the space formed between the pin and the roller after the same have been worn.

This arrangement thus eliminates the noise caused by the slapping of the cam roller against its bearing. The metal 18 may be compressed from time to time in order to take up this wear and thus maintain the operation of the bearing silent. Of course additional metal may be introduced into the opening 16 and compressed therein should occasion arise. In the form shown in Figure 5 the valve lifter or reciprocating member 19 is fitted through a bearing opening formed in the casting or engine block 20, and the latter is provided with a downwardly and inwardly inclined opening 21 which leads from the upper surface of the casting 20 to the bearing opening and is adapted to contain a body of bearing metal 22, which may be compressed in the opening 21 for forcing and spreading the bearing metal into the space which is formed between the valve lifter 19 and the casting 20.

The modification shown in Figure 6 illustrates a bearing sleeve 23 through which a movable member is placed and such member may either reciprocate or rotate in the bearing 23. As shown in Figure 7 the bearing 23 is provided in its wall with a through opening 24 the inner and outer ends of which are flared or counter bored as at 25 for the purpose of receiving and anchoring therein a body of bearing metal 26 or the like. By punching inwardly against the bearing metal 26 the latter is forced through the opening 24 and is caused to fill any space between the bearing and its shaft or rod and to spread outwardly into such space, as shown in Figure 6, to take up wear of relatively movable parts.

By this construction there is always present a body of the Babbitt or bearing metal and in such position that it may be readily forced in the cavities or spaces incident to wear, so as to take up lost motion between relatively movable parts and to maintain the same in accurate adjustment as well as to prevent noise incident to the slapping of the parts when subjected to intermittent pressure.

It is obvious that various changes and modifications may be made in the details of construction and design of the above specifically described embodiment of this invention without departing from the spirit thereof, such changes and modifications being restricted only by the scope of the following claims:—

What is claimed is:—

1. A bearing pin for a cam roller comprising an elongated member having an exterior bearing surface adapted to receive the roller thereon, said pin having in its upper portion an opening extending inwardly from one end of the pin and provided with an elongated slot in the upper side of the pin communicating with the opening and formed in the bearing face of the pin, and a soft bearing metal carried in said opening and slot and adapted to be compressed from the opening in the end of the pin to expand into the space formed between the pin and the roller incident to wear upon the same.

2. A wear compensating bearing comprising a bearing member having a bearing face and an aperture in said bearing face at one side of the bearing member, a second bearing member having a bearing face supported against the bearing face of the first bearing member and covering the aperture therein, said first bearing member having an opening extending therethrough from an outer exposed side to said aperture, and a filler of soft bearing metal packed in the slot and aperture and exposed at its inner end to the bearing faces of both of the bearing members and exposed at its outer end through said outer side of the first bearing member, said soft filler metal adapted to receive impact against its outer end to advance and spread the inner end of the soft filler metal between said bearing faces to take up wear therebetween.

GEORGE W. ROBERTS.